US005747782A

United States Patent [19]
Orrico et al.

[11] Patent Number: 5,747,782
[45] Date of Patent: May 5, 1998

[54] DEVICE AND PROCESS FOR MAKING COFFEE AND ESPRESSO BEVERAGES IN MICROWAVE OVEN

[76] Inventors: Mario Orrico, 6137 N. Harlem Ave., Chicago, Ill. 60631; Rou Farhadieh, 352 63rd St., Willowbrook, Ill.; Rudy Avramovich, 125 E. Sunnyside Ave., Libertyville, Ill. 60048; Stuart Koford, 19W281 Paul Revere La., Oak Brook, Ill. 60521

[21] Appl. No.: 610,840

[22] Filed: Mar. 5, 1996

Related U.S. Application Data

[63] Continuation of Ser. No. 458,309, Jun. 2, 1995, abandoned, which is a continuation of Ser. No. 37,814, Mar. 26, 1993, abandoned.

[51] Int. Cl.$^6$ ............................. H05B 6/80; A47J 31/10
[52] U.S. Cl. .................. 219/689; 99/307 R; 99/DIG. 14; 426/241
[58] Field of Search ...................... 219/689, 688; 99/302 R, 306, 303, DIG. 14, 451; 426/241, 243

[56] References Cited

U.S. PATENT DOCUMENTS

| | | |
|---|---|---|
| 3,757,670 | 9/1973 | Laama et al. ............... 99/302 R |
| 3,935,804 | 2/1976 | Perez ............................ 99/306 |
| 4,104,957 | 8/1978 | Freedman et al. . | 
| 4,167,899 | 9/1979 | McCormick ............... 99/302 R |
| 4,345,512 | 8/1982 | Moore . |
| 4,381,696 | 5/1983 | Korai . |
| 4,386,109 | 5/1983 | Bowen et al. . |
| 4,498,375 | 2/1985 | Bedini ........................ 99/303 |
| 4,577,080 | 3/1986 | Grossman . |
| 4,642,443 | 2/1987 | Jorgensen et al. ........ 219/689 |
| 4,721,835 | 1/1988 | Welker . |
| 4,990,734 | 2/1991 | Hirsch et al. . |
| 5,012,059 | 4/1991 | Boatman . |
| 5,028,753 | 7/1991 | Shariat ....................... 219/689 |
| 5,049,713 | 9/1991 | Creyaufmuller ............ 219/689 |
| 5,079,396 | 1/1992 | Katz et al. ................. 219/689 |
| 5,281,785 | 1/1994 | Pasbrig ...................... 219/689 |

FOREIGN PATENT DOCUMENTS 3206803 9/1982 Germany .

*Primary Examiner*—Philip H. Leung
*Attorney, Agent, or Firm*—McAndrews, Held & Malloy, Ltd.

[57] ABSTRACT

According to the present invention, water is placed in a water reservoir constructed of plastic microwave-transparent, pressure-resistant material. A funnel positioned on the upper surface of filter compartment is supported on the upper edges of the water reservoir with the spout extending downwardly into the water reservoir. A lower filter is placed into the filter compartment, and coffee grounds or other espresso particulate substance is placed on upper surface of the lower filter. An upper filter is then positioned on the upper surface of filter compartment to restrain the coffee grounds or other particular substance during brewing. A filtrate reservoir is placed over the funnel, and twisted, thereby engaging threads to join the water reservoir and the filtrate reservoir. A filtrate splash cover is attached to the upper edges of the filtrate reservoir. The assembled espresso device is placed into a microwave oven. As water in the water reservoir begins to boil, steam is generated, and boiling water is displaced upwards through the funnel and grounds, forming espresso. The filtrate splash cover provides for both venting and fluid retention during brewing. A resilient gasket, in conjunction with a plurality of vent passages, provides an additional means for pressure relief. The espresso is automatically emptied into the filtrate reservoir, which is designed to function as a drinking cup for individually-sized portions.

16 Claims, 4 Drawing Sheets

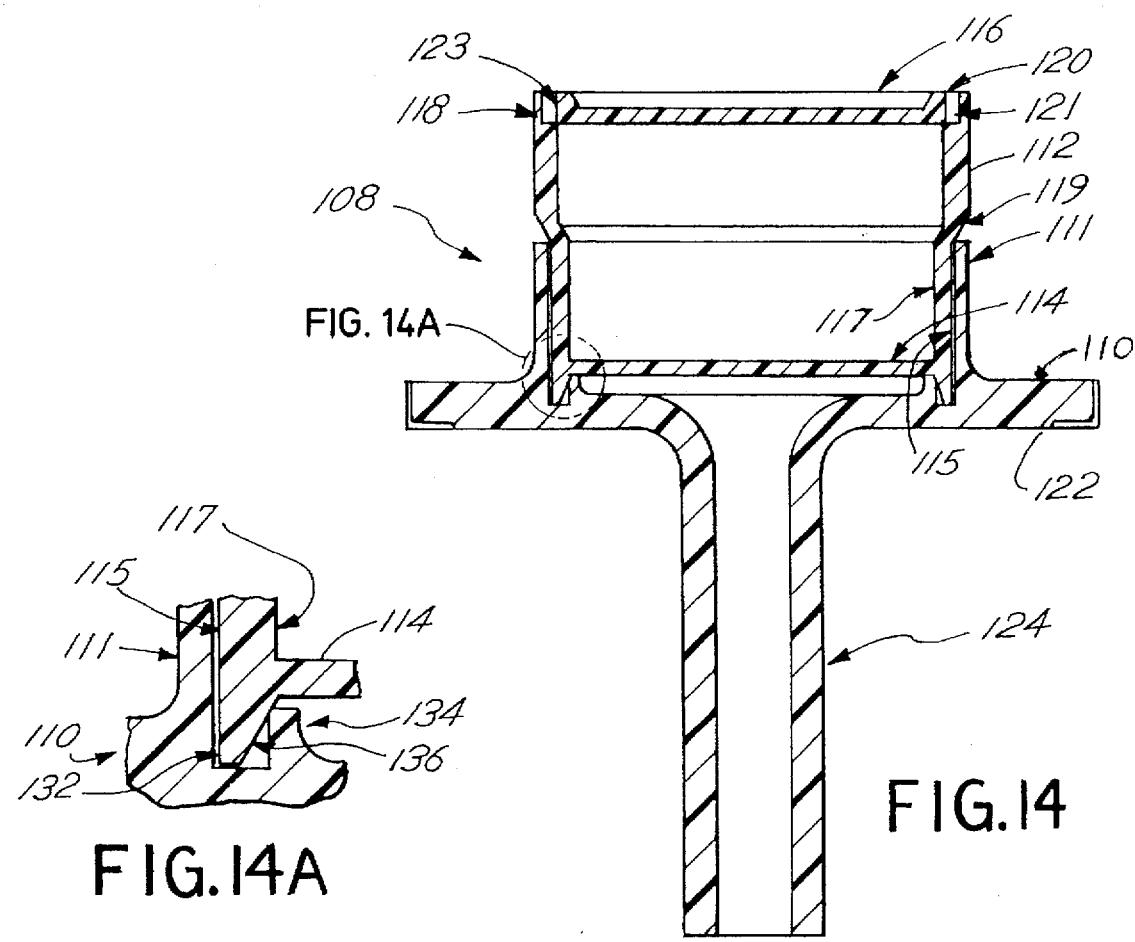
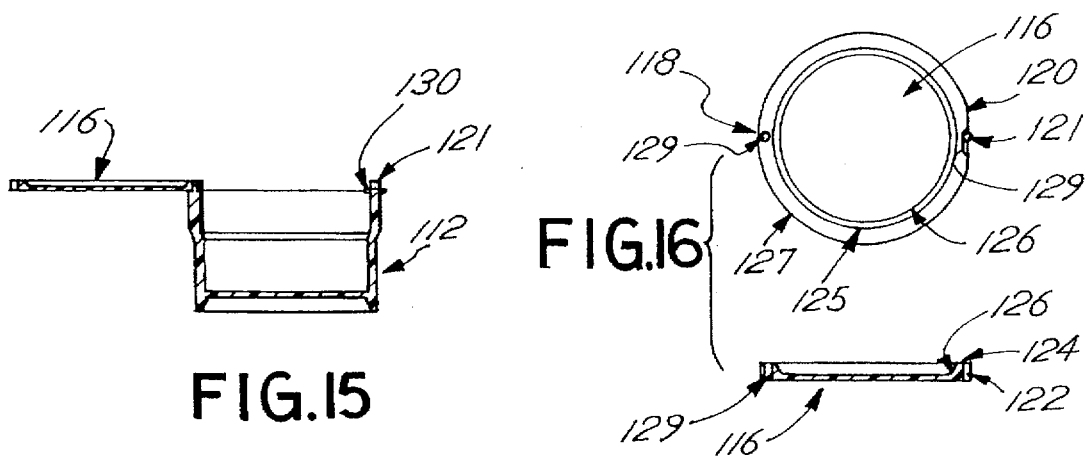

DEVICE AND PROCESS FOR MAKING COFFEE AND ESPRESSO BEVERAGES IN MICROWAVE OVEN

This is a continuation of application Ser. No. 08/458,309 filed Jun. 2, 1995 (Attorney Docket No. 1042US02) which is itself a continuation of application Ser. No. 08/037,814 filed Mar. 26, 1993 (Attorney Docket No. 92 P 757) now abandoned.

TECHNICAL FIELD

The present invention relates to a device and process for making coffee and espresso (sometimes called "expresso") beverages, and more particularly, but not exclusively, to a device and process for making coffee or espresso coffee in a microwave oven.

BACKGROUND OF THE INVENTION

In the beverage industry, the espresso process involves forcing hot water or steam under pressure through a particulate substance. The general method of making espresso coffee is well known. It involves the process or method of forcing hot water or steam through conventional coffee grounds or some extra fine coffee grounds. This method for making coffee differs significantly from the common methods for making drip-type or percolation coffees. The espresso coffee may be brewed with a mixture of espresso coffee grounds and cinnamon or other flavored syrups such as almond, orange, hazelnut, chocolate and the like. Espresso coffee generally is a dark full-bodied brew and may also be served as cappucino, caffe latte, caffe Americano, doppio, or macchiato.

Microwave ovens are widely used and known for a variety of heating tasks, including the heating of water for instant beverages or heating other beverages and foods. In addition, several devices have been proposed for brewing coffee in microwave ovens.

U.S. Pat. No. 4,104,957 issued Aug. 8, 1978 (Freedman et. al.) discloses a coffee brewing appliance comprising a carafe, a filter that fits in the neck of the carafe, and a water reservoir located over the filter. The water reservoir communicates with the filter by way of a thermally-controlled valve. When water in the water reservoir is heated by microwave radiation, the valve opens, allowing the water to flow into the filter, extracting coffee constituents from coffee grounds in the filter, so that a coffee beverage accumulates in the carafe.

U.S. Pat. No. 4,577,080 issued Mar. 18, 1986 (Grossman) discloses an appliance similar to that of Freedman et. al., except that instead of using a thermally-controlled valve to prevent cold water from the water reservoir from contacting coffee grounds in a filter, a body of non-toxic wax melts when the water reaches the desired temperature.

U.S. Pat. No. 4,721,835 issued Jan. 26, 1988 (Welker) discloses a device for brewing coffee in a microwave oven. The device comprises a jug having a top configured as a filter. Water and coffee grounds are placed in the jug, and the filter is fitted in the mouth of the jug. When the coffee has brewed, it can be poured from the jug, while the coffee grounds are retained by the filter.

U.S. Pat. No. 4,386,109 issued May 31, 1983 (Bowen et. al.) discloses an espresso coffee maker for use in a microwave oven. The water is stored in a microwave transparent reservoir which is adjacent to an aluminum pot. The pot and reservoir are coupled in a fixed spatial relationship by a collar. The collar includes a strainer which presses against a layer of coffee grounds when the collar is secured to the reservoir. The compressed coffee grounds in combination with the strainer for a pressure resistant seal over the opening of the reservoir. The water in the reservoir is heated by microwave energy. The pressure rises to a level sufficient to force steam and water in a downward direction through the coffee grounds into the pot, which stores the espresso coffee.

U.S. Pat. No. 4,381,696 issued May 3, 1983 (Koral) discloses a coffee brewing appliance that is generally similar to that disclosed by Freedman et. al.

U.S. Pat. No. 4,345,512 issued Aug. 24, 1982 (Moore) discloses a tea infuser for use in a microwave oven. The tea infuser, instead of being made of metal, is made of microwave-transparent plastic material.

U.S. Pat. No. 5,012,059 issued Apr. 30, 1991 (Boatman) discloses a device for heating water in a microwave oven. In Boatman's device, water is heated in a water reservoir, then forced from the water reservoir through a tube into a heating chamber, where it is further heated prior to draining through a filter filled with coffee grounds.

U.S. Pat. No. 4,990,734 issued Feb. 5, 1991 (Hirsch et. al.) discloses a method of preparing coffee where a mixture of water and coffee grounds is heated with microwave radiation, whereby a pressure gradient is produced across a filter, forcing filtrate into a vessel.

German No. OS 3,206,803 includes, seated one on the other, a coffee pot, a filter to receive coffee, and a water container. The water container is pervious to microwave radiation and the filter is developed so that substantially no liquid can pass through the filter under atmospheric or ambient pressure. The device is placed in a microwave oven in which the microwave radiation brings the water in the water container to a boil, while the coffee remains screened off. The formation of steam develops such a high pressure in the water container (up to 3.45 bar) that the water is forced through the filter.

SUMMARY OF THE INVENTION

One of the objects of the present invention is to provide a safe and convenient method and device for brewing coffee or espresso coffee, as well as other espresso beverages such as cappucino, caffe latte, caffe Americano, doppio or macchiato, in a microwave oven.

Another object of the present invention is to provide a device for making coffee or espresso beverages in a microwave oven, from which device one may conveniently drink individually-sized servings.

Still another object of the present invention is to provide a device for making coffee or espresso beverages in a microwave oven and providing for adequate pressure-relief and/or splashing safeguards.

Yet another object of the invention is to provide a device for making coffee or espresso beverages, in particular espresso coffee, in a microwave oven while preventing messy splashing or bubbling over of the beverage.

According to the present invention, water is poured into a water reservoir made of a plastic microwave-transparent, pressure-resistant material suitable for use with beverages. After filling the water reservoir with water, a removable funnel, consisting of a cylindrical filter compartment and spout, is mounted on upper edges of the water reservoir with the spout of the funnel extending downwardly into the water reservoir. A lower filter is positioned into the filter compartment and coffee grounds, or other espresso particulate substance, are placed on upper surface of the lower filter.

An upper filter is then positioned on the upper edges of the filter compartment, thereby enclosing and restraining the espresso particulate substance. A filtrate reservoir is threadably engaged to the water reservoir such that the filter compartment is enclosed entirely and generally intermediate the filtrate reservoir and water reservoir. A pressure dissipator is positioned within the filtrate reservoir. A filtrate splash cover is mounted on the upper edge of the filtrate reservoir.

The microwave espresso device is placed into a microwave oven, which is then set for about two minutes, depending upon the power of the microwave oven, and the quantity of espresso being brewed, and sea level elevation. Microwave radiation from the microwave oven heats the water in the pressurized water reservoir, causing steam to form and water to boil. As the water in the water reservoir begins to boil, steam pressure develops and begins to displace the boiling water, causing boiling liquid and steam to rise upwards through the spout of the funnel, through the filters and espresso substance in the filter compartment, and through the pressure dissipater into the filtrate reservoir. The coffee or espresso coffee thus is brewed.

In the event of overheating or an excessive buildup of pressure within the espresso device, a pressure relief valve is provided. A resilient gasket is positioned between the funnel flange and the ring bottom of the filtrate reservoir. A plurality of vent passages connect the interior of water reservoir and the lower surface of the gasket. The gasket, in conjunction with the vent passages, serves as a pressure release valve. Upon high pressures, the gasket deforms and permits a release of high pressure steam from the water reservoir into the atmosphere.

The filtrate splash cover serves as a splash guard to prevent release of bubbles or pressurized fluid into the microwave oven. The splash cover also provides for venting. Upon removal of the filtrate splash cover, the espresso may be imbibed directly from the filtrate reservoir, which is designed to function as a drinking cup. An insulation jacket or a handle is affixed to the exterior surface of the espresso device for handling and lifting the hot device.

The present invention thus provides a simple, safe, inexpensive, and convenient means for brewing coffee and espresso beverages in the microwave oven. Other objects, advantages, and novel features of the present invention will become apparent from the following description and drawing.

BRIEF DESCRIPTION OF THE DRAWINGS

FIG. 14 is a cross-sectional representation of an alternative funnel having a removable filter canister.

FIG. 14A is a detail of the seal formed by the filter canister and the funnel flange at the annular groove as shown in FIG. 14.

FIG. 15 is a cross-sectional representation of the filter canister of funnel shown in FIG. 14 and its top filter in the open position.

FIG. 16 is a cross-sectional representation of the top filter of the filter canister of the funnel shown in FIG. 14.

DETAILED DESCRIPTION OF THE INVENTION

Figure 1:
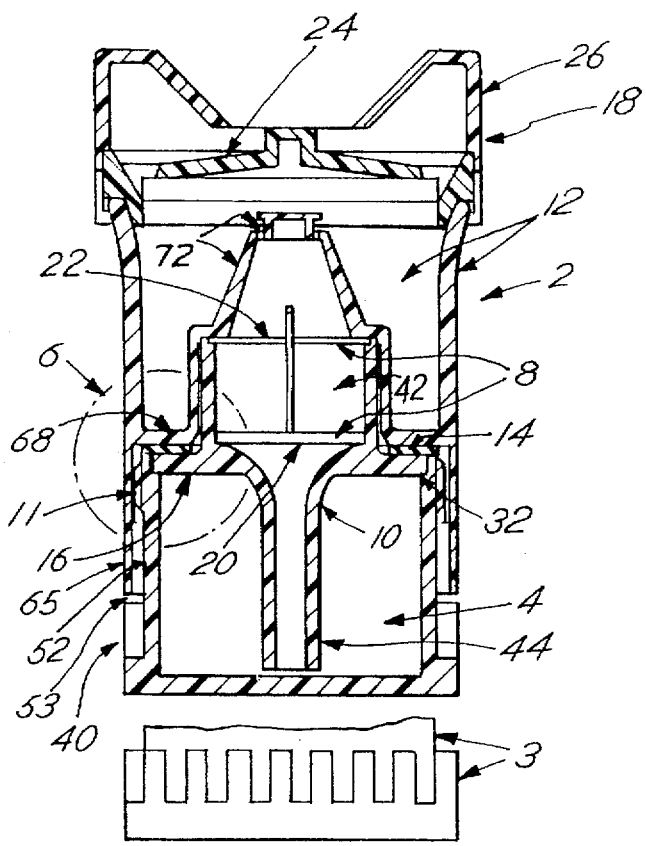
FIG. 1 is a cross-sectional representation of the microwave espresso device.

Referring to FIG. 1, there is generally shown a microwave espresso device 2 embodying the invention. FIG. 1 is a cut-away cross section of the exterior surface 3 of the espresso device. The espresso device is generally constructed of a plastic microwave-transparent, pressure-resistant material suitable for contact with beverages. By microwave-transparent, it is meant that microwave energy will pass through the material without substantial loss of energy.

Appropriate materials include Polyethylene Terephthalate (PET), polyether imide (ULTEM), or polyether imide-polycarbonate blend (ULTEM LTX SERIES).

The espresso device 2 includes a cylindrical water reservoir 4 having a pressure relief valve 6; a filter apparatus 8 for holding coffee grounds or other espresso particulate substance; a cylindrical filtrate reservoir 12, which detachably connects to the water reservoir 4; a funnel 10 for holding the filter apparatus 8 and for conducting steam and water from the water reservoir 4 to a filtrate reservoir 12; a pressure dissipater 72 integrally molded with the filtrate reservoir 12; a gasket 14 inserted between a funnel flange 16 of the funnel 10 and the ring bottom 68 of the filtrate reservoir 12 to form part of the pressure relief valve 6; and a detachable filtrate splash cover 18.

The water reservoir 4 is threadably and releasably engaged to the filtrate reservoir 12 at connection 11. This engagement clamps the removable funnel 10 to the upper edge 32 of the water reservoir 4, and further holds the gasket 14 in position between ring bottom 68 of the filtrate reservoir 12 and the funnel flange 16 and/or upper edge 32 of the water reservoir 4.

The funnel 10 includes a spout 44 and cylindrical filter compartment 42. The filter apparatus 8 includes a removable lower filter 20 and a removable upper filter 22. The filtrate splash cover 18 includes a cover section 24 and a splash guard 26. The water reservoir 4 provides a pressurized chamber for the containment of steam and liquid during the espresso making process. The filtrate splash cover 18 acts as a splash guard, breaks down bubbles, and provides for venting. The filtrate reservoir 12, after removal of filtrate splash cover 18, provides a means for direct consumption of the finished beverage. The espresso device may be sized for an individual serving or for multiple, larger servings.

To operate, a suitable quantity of water is poured into the water reservoir 4, and the circular funnel flange 16 is placed on the upper edge 32 of the water reservoir 4. The spout 44 extends downwardly into the water reservoir 4. The circular lower filter 20 is positioned within the lower portion of the filter compartment 42 to form a seal or seat between the spout 44 and the filter compartment 42. Ground coffee, or other espresso particulate substance, either loose or contained in a paper bag or other filter, is placed on the upper surface of the lower filter 20. Paper filters could be approximately 20 microns. The circular upper filter 22 is attached to the upper edges of filter compartment 42. The filtrate reservoir 12 is threadably engaged or otherwise affixed at connection 11 to the water reservoir 4 such that the filter compartment 42 is enclosed entirely and located generally intermediate the filtrate reservoir 12 and water reservoir 4. The filters 20 and 22 may be shapes other than circular. The cover section 24 is detachably engaged with the upper surface 2 of the filtrate reservoir 12, and the splash guard 26 is snapped into place over the cover section 24.

Upon application of the microwave energy and as water in the water reservoir 4 heats and begins to boil, steam pressure in the water reservoir 4 forces boiling liquid and steam to rise upwards through the spout 44, lower filter 20, espresso particulate substance, upper filter 22, and the pressure dissipater 72 into the filtrate reservoir 12. The filtrate splash cover 18 serves to break up bubbles and deflect liquid into the filtrate reservoir 12 and to contain steam within the filtrate reservoir, where it may cool and condense. The filtrate splash cover 18 thereby limits the undesired escape of fluid and steam into the microwave oven. This improves the efficiency of the process and minimizes the necessary size of the water reservoir 4 for devices brewing individual portions. The process continues until most of the water has been discharged into the filtrate reservoir 12. Espresso may be brewed in approximately two minutes, depending upon the power of the oven, the quantity of espresso being brewed, and the atmosphere conditions.

Figure 2:
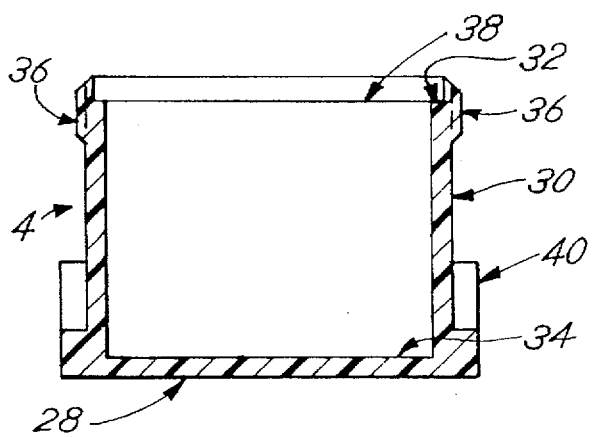
FIG. 2 is a cross-sectional representation of the water reservoir.
Figure 8:
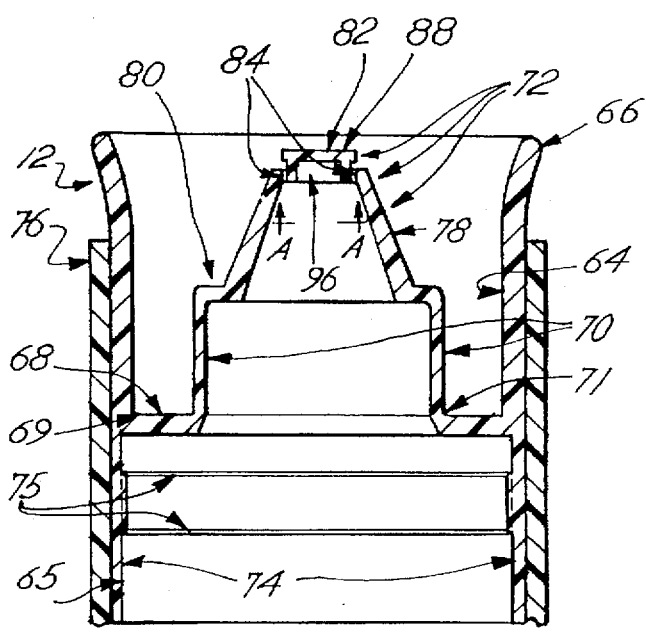
FIG. 8 is a cross-sectional representation of the filtrate reservoir.

Referring to FIG. 2, the water reservoir 4 comprises a circular base 28 and a cylindrical water reservoir wall 30 having an upper edge 32 and a lower edge 34. The lower edge 34 of the water reservoir wall 30 connects to the circular base 28. Just below the upper edge 32, there is an annular boss 36 on the outside of the water reservoir wall 30. In another alternative, the boss 36 may be a series of bosses circumferentially-spaced on the outside of the water reservoir wall 30. On the annular boss 36, there are threads (not shown) which are designed for the swift engagement of reciprocal threads (not shown) on the filtrate reservoir 12 (FIG. 8). Near the upper edge 32, the inside diameter of the water reservoir wall 30 abruptly increases, thereby defining an annular, reservoir ledge 38. The outside of the water reservoir 4 is molded with ribs 40 for strength, ornamentation and to provide a grip to comfortably tighten the final assembly.

Figure 3:
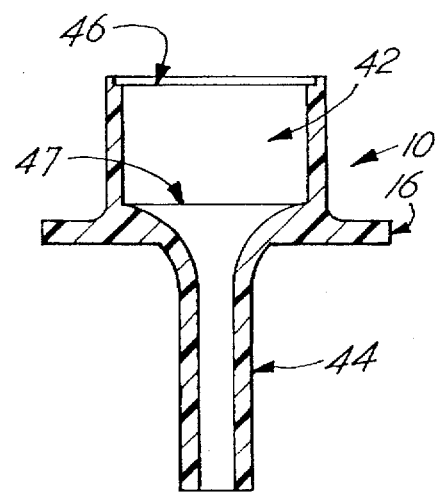
FIG. 3 is a cross-sectional representation of the funnel.

Referring to FIG. 3, there is generally shown the funnel 10, which comprises a cylindrical filter compartment 42, a spout 44, and the funnel flange 16. The funnel flange 16 connects, and defines a transitional passageway between, the filter compartment 42 and the spout 44. The funnel flange 16 includes an interior ledge 47 for positioning, supporting, and seating the lower filter 20.

The filter compartment 42 has an inside diameter which is generally constant, except that near the top of the filter compartment 42, the inside diameter abruptly increases, thereby defining an annular, filter compartment ledge 46, which is used to support, position, and seat the upper filter 22 during operation. The inside diameter of the funnel flange 16 is variable, thereby providing a smooth transition between the filter compartment 42 and the inside of the spout 44.

Figure 4:
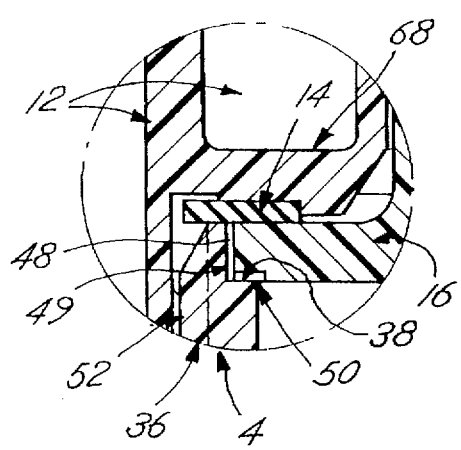
FIG. 4 is a detail of the pressure relief valve.

Referring to FIG. 4 (a detail of FIG. 1), the outside diameter of the funnel flange 16 is somewhat less than the inside diameter 49 of the upper portion of the water reservoir 4, thereby defining an annular space 48 when the funnel flange 16 is set in its operating position on the reservoir ledge 38.

The pressure relief valve 6 comprises the gasket 14, four flange grooves 50, and a plurality of gaps 52 located in the threads on the annular boss 36 and in the reciprocal threads on the filtrate reservoir 12. More or less flange grooves may be appropriate. The flange grooves 50 provide a passage between the water reservoir 4 and the annular space 48. When pressure in the water reservoir 4 exceeds a certain limit, preferably in the range of 40 to 60 psi, steam escapes through the annular space 48, underneath the gasket 14 which resiliently deforms, and through the plurality of gaps 52 in the outside and inside threads. As shown in FIG. 1, the released steam passes through a passage formed by the lower wall 65 of the filtrate reservoir 12 and the outer surface of the water reservoir 4 and escapes at escape opening 53.

The gasket 14 is made of a resilient material such as food grade silicon rubber. The gasket is designed to fit into an annular space between the ring bottom 68 of the filtrate reservoir 12 and the top surface of the funnel flange 16. The arrangement shown in FIG. 4, where the gasket has a hardness of approximately 60 durameters, was found to provide pressure relief at approximately 50–60 psi. Other gasket hardnesses or pressure relief settings are appropriate depending on the circumstances and design considerations. It should be noted that the outside diameter of the gasket 14 is somewhat greater than the outside diameter of the reservoir ledge 38, thereby covering or overlapping the annular space 48. When the filtrate reservoir 12 is threaded into the water reservoir 4, the removable gasket 14 is held in position.

Alternative pressure relief valves include the upper filter 22 where fault lines are created for the purpose of breaking under pressure and thus opening up a larger passage for pressure relief.

Figure 5:
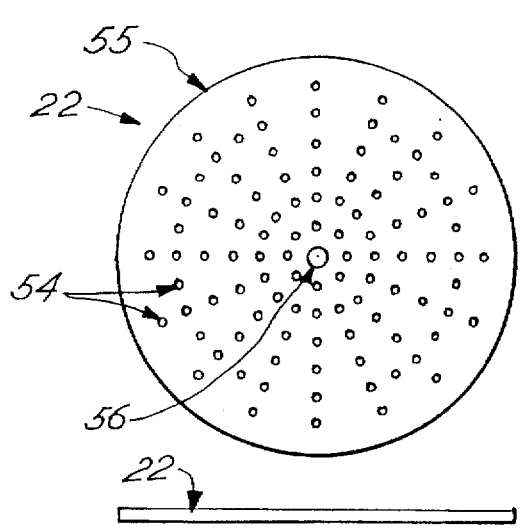
FIG. 5 is a plan and cross-sectional view of the upper filter.

Referring to FIG. 5, the upper filter 22 has a plurality of perforations 54 of a size and number sufficient to retain the espresso particulate substance, while allowing passage of steam and water. The size of the openings typically can range from 0.020 to 0.032 inches in diameter; although other sizes may be suitable depending on the size of the particulate substance; the number of openings can range from 100 to 150. The typical opening size is 0.032 inches, and the typical number is 124. The upper filter 22 has an outside diameter 55 which is slightly less than that of the filter compartment ledge 46 (shown in FIG. 3), for ease of placement of the upper filter 22 on, and removal of the upper filter 22 from, the filter compartment ledge 46. A central orifice 56 defined by the upper filter 22 is sized to accommodate passage of a filter handle 58, which is shown in FIGS. 6 and 7.

Figure 6:
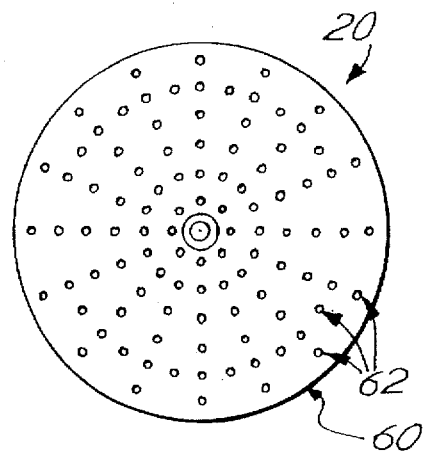
FIG. 6 is a plan view of the lower filter.
Figure 7:
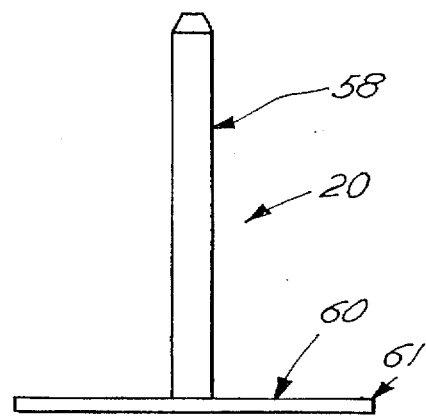
FIG. 7 is an elevation of the lower filter.

Referring to FIGS. 6 and 7, the lower filter 20 comprises the filter handle 58, and a lower circular filter disc 60. The filter handle 58, which is generally cylindrical, is perpendicularly connected to the center of the lower filter disc 60. The lower filter disc 60 has a plurality of perforations 62 of a size and number sufficient to allow free movement of steam and water, while retaining coffee grounds or other espresso particulate substance. The size of the openings can range from 0.032 to 0.065 inches in diameter; the number of openings typically can range from 100 to 150. The typical opening size is 0.040 inches, and the typical number is 124.

The diameter 61 of the lower filter disc 60, is slightly less than the inside diameter of the filter compartment 42 to facilitate displacement, and manual removal and replacement, of the lower filter 20.

Referring to FIG. 8, the filtrate reservoir 12 includes a generally cylindrical filtrate reservoir wall 64, a lip 66, a ring bottom 68, a filter compartment sleeve 70, a conical pressure dissipater nozzle 72, and a reservoir sleeve 74.

The filtrate reservoir wall 64 connects to the ring bottom 68, which in turn connects to the conical filter compartment sleeve 70. The filter compartment sleeve 70 is connected to the pressure dissipater 72. Preferably, the entire assembly is integrally molded or manufactured.

The lip 66, which is located at the top edge of the filtrate reservoir wall 64, is fluted slightly outward, and is rounded, to facilitate pouring, or sipping, of a beverage.

The reservoir sleeve 74 is a cylindrical shell which seamlessly continues the outside surface of the filtrate reservoir wall 64 and lower wall 65. The outside surface of the reservoir sleeve 74 and the outside surface of the filtrate reservoir wall 64 and lower wall 65 are covered with continuous foam insulation 76, such as foam silicon rubber or molded vinyl foam, to enable manual gripping of an otherwise potentially hot surface. In another alternative, a handle (not shown), which may be of any of the well-known types used with coffee mugs, may be integrally molded or otherwise attached to filtrate reservoir to enable manual gripping.

The inside surface of the reservoir sleeve 74 has a diameter slightly larger than the outside diameter of the water reservoir 4, thereby facilitating the placement of the reservoir sleeve 74 over a portion of the water reservoir 4. The reciprocal threads (not shown) on the filtrate reservoir 12 are located in a thread area 75 on the inside surface of the reservoir sleeve 74.

The ring bottom 68 has an outside edge 69 which is connected to the filtrate reservoir wall 64, and an inside edge 71 which is connected to the filter compartment sleeve 70.

The inside diameter of the filter compartment sleeve 70 is slightly larger than the outside diameter of the filter compartment 42 (shown in FIG. 3) to facilitate the containment or covering of the filter compartment 42 when the filtrate reservoir is positioned for operation.

Figure 9:
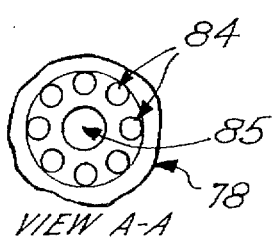
FIG. 9 is a plan view of the pressure dissipater.
Figure 10:
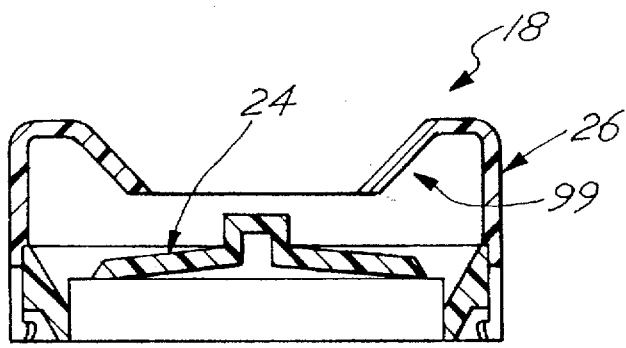
FIG. 10 is a cross-sectional representation of the filtrate splash cover.
Figure 11A:
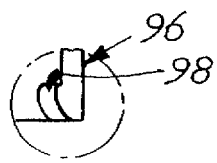
FIG. 11A is a detail of the projecting tips of the splash guard section shown in FIG. 11.
Figure 11:
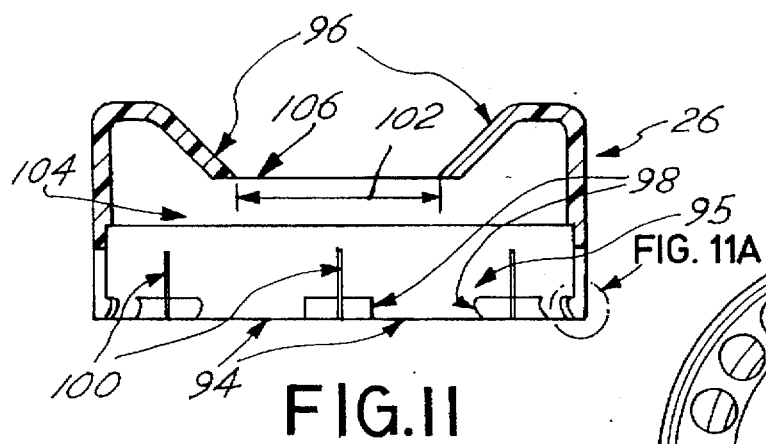
FIG. 11 is a cross-sectional representation of the splash guard section of the filtrate splash cover.
Figure 13:
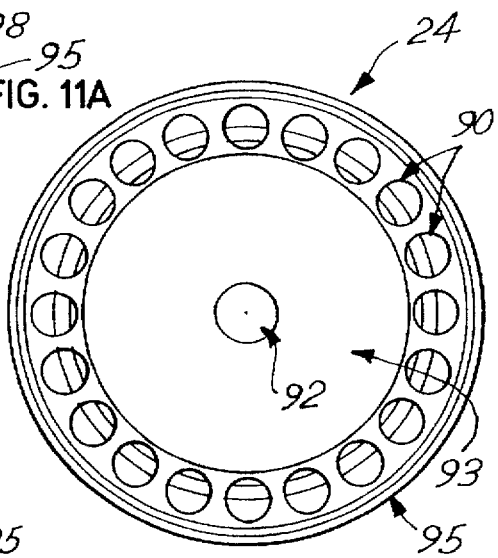
FIG. 13 is a plan view of the cover section.
Figure 12:
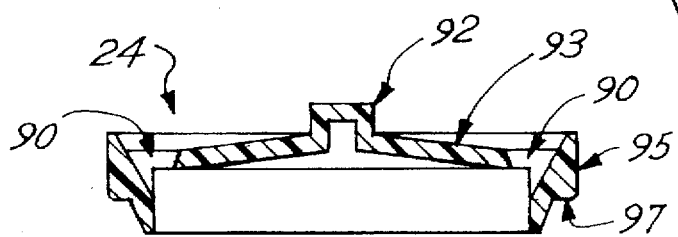
FIG. 12 is a cross-sectional representation of the cover section of the filtrate splash cover.

Referring to FIGS. 8 and 9, the pressure dissipater 72 comprises a nozzle 78 having two ends of different size, with the wide end having a flange 80 for connecting the nozzle 78 and the filter compartment 70. The other end has a spool-shaped cap 82. The cap includes a plurality of exit orifices 84 and an opening 85 for a central pressure dissipation chamber 86, and an upper blind flange 88, the outside rim of which acts as a baffle to deflect fluid exiting the pressure dissipater 72.

The pressure dissipater flange 80 integrally connects the nozzle 78 to the top rim of the filter compartment sleeve 70 (shown in FIG. 8), and holds down the upper filter 22 (shown in FIG. 1) during operation.

Referring to FIGS. 10 through 13, the filtrate splash cover 18 includes the cover section 24 and splash guard 26, which when combined are removably mounted upon the lip 66 of the filtrate reservoir 12. The cover section 24 has a plurality of vent holes 90, lift knob 92, deflector portion 93, and annular ring 95. The annual ring 95 includes a notch 97 for cooperating mechanically with lip 66 of the filtrate reservoir 12. The splash guard 26 includes approximately eight fingers 94 and splash baffle 96. More or less fingers may be appropriate depending upon the design. The lower edge 95 of the splash baffle 96 connects to the fingers 94. Each of the fingers has projecting tips 98 designed to releasably grip the lip 66 (FIG. 8) of the filtrate reservoir 12. The fingers 94 define slots 100, which allow the fingers 94 to move independently of one another. Alternative releasable gripping arrangements may be used. An upper, inside edge 106 of the splash baffle 96 defines a downwardly extending angular surface 99 for deflecting downward the liquid which passes through the vent holes 90 of the cover section and a central orifice 102, which vents the espresso device 2. An annular ledge 104 on the inside of the splash guard 26 is designed to hold the cover section 24 (shown in FIGS. 1 and 10) in place during microwave heating. The filtrate splash cover 18 serves to deflect pressurized liquid into the filtrate reservoir 12, to limit the escape of steam, to further depressurize the liquid, and to break up bubbles formed during the brewing process, all designed to prevent or minimize the spraying or spillage of liquid into the microwave during the heating process.

Referring to FIGS. 14 through 16, an alternative funnel 108 is shown. The funnel 108 includes a cylindrical, self-contained coffee filter canister 112, a funnel flange 122 and spout 124. The funnel flange 122 includes an outer flange ring 110 and a cylindrical upstanding flange projection 111. The cylindrical upstanding flange projection 111 forms a pocket for removably fitting the filter canister 112. The funnel flange 122 connects and defines a transitional passageway between the filter canister 112 and the spout 124.

The cylindrical filter canister 112 has an outer wall 115 and an inner wall 117 having a generally constant diameter in the lower portion. A transitional section 119 increases the wall diameters of the upper portion of the filter canister 112. An annular ledge 130 is formed at the top of cylindrical wall of the filter canister 112. Although the filter canister 112 and cooperative upstanding flange projection 111 are cylindrical, other shapes may be used.

An upper filter 116 is attached to the filter canister 112 at pin 123 of connection 118 and is seated on ledge 130 during operation. Pin 123 is attached to the ledge 130 of the filter canister 112. Referring to FIGS. 15 and 16, the upper filter 116 is capable of sliding along the ledge 130 and swiveling about pin 123 at connection 118 for access into the inside of canister 112. The upper filter 116 has a plurality of perforations or openings (not shown) of size and number sufficient to retain the espresso particulate substance, while allowing passage of steam and water, similar to that shown in FIG. 5. The upper filter has an annular crown 126 with inner crown edge 125, outer crown edge 127, and a pin opening 129. The upper filter 116 has an outside diameter which is substantially the same as the outside diameter of the upper portion of the filter canister 112, except there is a beveled portion 120 formed out of the outer crown edge 127 and detent 129 which cooperate with pin 121 mounted on the upper surface of the filter canister 112. This connection permits the snapping into place for operation, and subsequent swiveling of the upper filter 116. In another alternative (now shown), the upper filter may be hinged to the filter canister or removable completely from the filter canister.

A lower filter 114 is integrally formed in the filter canister 112. The lower filter 114 has a plurality of perforations or openings (not shown) of size and number sufficient to allow free movement of steam and water, while retaining coffee grounds or other espresso particulate substance, similar to that shown in FIG. 6.

Referring to Detail B of FIG. 14, the filter canister 112 forms a seal with funnel flange 122 at annular groove 132 which is formed by annular abutment 134 and the inside surface of upstanding flange projection 111 which projects from the upper surface of the outer ring flange 110. An annular footing 136, having an angular or tapered inner surface, projects from the bottom edge of the filter canister 112 and seats upon the bottom of groove 132 or the abutment 134 to form a substantial seal to prevent liquid and steam from bypassing the lower filter 114.

During the espresso process, the filter canister 112 offers additional flexibility in that it can be removed from the funnel 108 to simplify the placement of loose espresso particulate substance, loose coffee grounds or filter bags or packets into the canister. The upper filter 116 swivels to an open position for the placement of particulate and then snaps back into place. The lower filter 114 is conveniently molded integrally into the canister. After the filter canister 112 is placed back into the pocket of the upstanding flange projection 111, the espresso process will proceed as previously described.

It will be appreciated that the present invention is not restricted to the particular embodiment that has been described and illustrated, and that variations may be made therein without departing from the scope of the invention as defined in the appended claims and equivalents thereof.

What is claimed is:

1. An espresso device for making espresso beverages in a microwave oven, the espresso device having: a water reservoir capable of containing a liquid; a filter apparatus for holding an espresso particulate substance; and having at least one filter for substantially retaining the particulate substance while permitting the passage of liquid and steam; a funnel having a filter compartment for mounting the filter apparatus, a spout extending downwardly into the water reservoir; and a funnel flange which connects the filter compartment to the spout; a filtrate reservoir detachably connectable to the water reservoir, the funnel connected to the water reservoir such that the filter apparatus is generally intermediate the water reservoir and filtrate reservoir, a filtrate splash cover detachably connected to the filtrate reservoir for deflecting liquid into the filtrate reservoir: and a pressure relief valve for relieving pressure within the device during heating in a microwave oven wherein the water reservoir has an upper portion with a reservoir ledge, and the device further having a substantially annular space formed between the funnel flange and the upper portion when the funnel flange is positioned on the reservoir ledge, the filtrate reservoir having a ring bottom; the funnel flange having a top surface, a gasket positioned between the ring bottom and top surface in an arrangement normally sealing and overlapping the annular space such that upon a pressure exceeding a predetermined level in the water reservoir, the gasket will deform resiliently to form a passageway for liquid and steam through the annular space to the exterior of the espresso device; whereby, upon heating with microwave energy during normal operation, the liquid and steam located in the water reservoir is pressurized and directed through the spout and the filter apparatus containing the espresso particulate substance, and into the filtrate reservoir.

2. The espresso device of claim 1 wherein the filtrate reservoir and water reservoir cooperate to form a drinking cup for consuming individually-sized servings.

3. An espresso device for making espresso beverages in a microwave oven, the espresso device having: a water reservoir capable of containing a liquid; a filter apparatus for holding an espresso particulate substance and having at least one filter for substantially retaining the particulate substance while permitting the passage of liquid and steam; a funnel having a filter compartment for mounting the filter apparatus, a spout extending downwardly into the water reservoir, and a funnel flange which connects the filter compartment to the spout; a filtrate reservoir detachably connectable to the water reservoir, the funnel connected to the water reservoir such that the filter apparatus is generally intermediate the water reservoir and filtrate reservoir; a filtrate splash cover detachably connected to the filtrate reservoir for deflecting liquid into the filtrate reservoir, the splash cover includes a cover section and a splash guard removably mounted on the filtrate reservoir, the cover section having a plurality of vent holes and a deflector portion to deflect pressurized liquid into the filtrate reservoir, the splash guard includes a vent and a splash baffle which further defines a surface for deflecting liquid which escapes through the vent holes of the cover section downwardly back into the filtrate reservoir; and means for relieving pressure within the device during heating in a microwave oven; whereby, upon heating with microwave energy, the liquid and steam located in the water reservoir is pressurized and directed through the spout and the filter apparatus containing the espresso particulate substance, and into the filtrate reservoir.

4. The espresso device of claim 3 wherein the splash guard has a lower edge which has spaced fingers, the fingers having projecting tips designed to removably grip the filtrate reservoir for mounting thereon.

5. The espresso device of claim 3 wherein the filtrate reservoir and water reservoir cooperate to form a drinking cup for consuming individually-sized servings.

6. An espresso device for making espresso beverages in a microwave oven, the espresso device having: a water reservoir capable of containing a liquid; a filter apparatus for holding an espresso particulate substance and having at least one filter for substantially retaining the particulate substance while permitting the passage of liquid and steam; a funnel having a filter compartment for mounting the filter apparatus, a spout extending downwardly into the water reservoir, and a funnel flange which connects the filter compartment to the spout; a filtrate reservoir detachably connectable to the water reservoir, the funnel connected to the water reservoir such that the filter apparatus is generally intermediate the water reservoir and filtrate reservoir; a filtrate splash cover detachably connected to the filtrate reservoir for deflecting liquid into the filtrate reservoir; a pressure dissipator integrally molded within the filtrate reservoir for dissipating the pressure of the liquid passing from the filter apparatus into the filtrate reservoir; and means for relieving pressure within the device during heating in a microwave oven; whereby, upon heating with microwave energy, the liquid and steam located in the water reservoir is pressurized and directed through the spout and the filter apparatus containing the espresso particulate substance, and into the filtrate reservoir.

7. The espresso device of claim 6 wherein the filtrate reservoir and water reservoir cooperate to form a drinking cup for consuming individually-sized servings.

8. An espresso device for making espresso beverages in a microwave oven, the espresso device having: a water reservoir capable of containing a liquid; a filter apparatus for holding an espresso particulate substance and having at least one filter for substantially retaining the particulate substance while permitting the passage of liquid and steam; the filter apparatus being a removable self-contained filter canister having side walls with top and bottom portions and a first filter and second filter attached to the top and bottom portions of the side walls, whereby the filter canister is capable of being removed from the filter compartment for ease of filling with particulate substance, the first filter being hingedly attached to one of the portions of the filter canister, the first filter being attached through a pin to one of the portions of the filter canister, such that the first filter slidably swivels with respect to the filter canister to open the canister for filling or removing the particulate substance from the filter canister; a funnel having a filter compartment for mounting the filter apparatus, a spout extending downwardly into the water reservoir, and a funnel flange which connects the filter compartment to the spout; a filtrate reservoir detachably connectable to the water reservoir, the funnel connected to the water reservoir such that the filter apparatus is generally intermediate the water reservoir and filtrate reservoir; a filtrate splash cover detachably connected to the filtrate reservoir for deflecting liquid into the filtrate reservoir; and means for relieving pressure within the device during heating in a microwave oven; whereby, upon heating with microwave energy, the liquid and steam located in the water reservoir is pressurized and directed through the spout and the filter apparatus containing the espresso particulate substance and into the filtrate reservoir.

9. The espresso device of claim 8 wherein the filtrate reservoir and water reservoir cooperate to form a drinking cup for consuming individually-sized servings.

10. A device for making heated beverages in a microwave oven, the device having: a water reservoir capable of containing a liquid; a filter apparatus for holding a particulate substance and having at least one filter for substantially retaining the particulate substance while permitting the passage of liquid and steam; a funnel having a filter compartment for mounting the filter apparatus, a spout extending downwardly into the water reservoir, and a funnel flange which connects the filter compartment to the spout; a filtrate reservoir connected to the water reservoir, the funnel connected to the water reservoir such that the filter apparatus is generally intermediate the water reservoir and filtrate reservoir; a filtrate splash cover detachably connected to the filtrate reservoir for deflecting liquid into the filtrate reservoir; and a pressure relief valve within the device during heating in a microwave oven, the water reservoir has an upper portion with a reservoir ledge, and the device further having a substantially annular space formed between the funnel flange and the upper portion when the funnel flange is positioned on the reservoir ledge, the filtrate reservoir having a ring bottom; the funnel flange having a top surface, a gasket positioned between the ring bottom and top surface in an arrangement normally sealing and overlapping the annular space such that upon a pressure exceeding a predetermined level in the water reservoir, the gasket will deform resiliently to form a passageway for liquid and steam through the annular space to the exterior of the device; whereby, upon heating with microwave energy during normal operation, the liquid forms steam and the liquid and steam located in the water reservoir are pressurized and directed through the spout and the filter apparatus containing the particulate substance, and into the filtrate reservoir.

11. The espresso device of claim 10 wherein the filtrate reservoir and water reservoir cooperate to form a drinking cup for consuming individually-sized servings.

12. A device for making heated beverages in a microwave oven, the device having: a water reservoir capable of containing a liquid; a filter apparatus for holding a particulate substance and having at least one filter for substantially retaining the particulate substance while permitting the passage of liquid and steam; a funnel having a filter compartment for mounting the filter apparatus, a spout extending downwardly into the water reservoir, and a funnel flange which connects the filter compartment to the spout; a filtrate reservoir connected to the water reservoir, the funnel connected to the water reservoir such that the filter apparatus is generally intermediate the water reservoir and filtrate reservoir; a filtrate splash cover detachably connected to the filtrate reservoir for deflecting liquid into the filtrate reservoir, the splash cover includes a cover section and a splash guard removably mounted on the filtrate reservoir, the cover section having a plurality of vent holes and a deflector portion to deflect pressurized liquid into the filtrate reservoir, the splash guard includes a vent and a splash baffle which further defines a surface for deflecting liquid which escapes through the vent holes of the cover section downwardly back into the filtrate reservoir; and means for relieving pressure within the device during heating in a microwave oven; whereby, upon heating with microwave energy, the liquid forms steam and the liquid and steam located in the water reservoir are pressurized and directed through the spout and the filter apparatus containing the particulate substance, and into the filtrate reservoir.

13. The device of claim 12 wherein the splash guard has a lower edge which has spaced fingers, the fingers having projecting tips designed to removably grip the filtrate reservoir for mounting thereon.

14. The espresso device of claim 12 wherein the filtrate reservoir and water reservoir cooperate to form a drinking cup for consuming individually-sized servings.

15. A device for making heated beverages in a microwave oven, the device having: a water reservoir capable of containing a liquid; a filter apparatus for holding a particulate substance and having at least one filter for substantially retaining the particulate substance while permitting the passage of liquid and steam; a funnel having a filter compartment for mounting the filter apparatus, a spout extending downwardly into the water reservoir, and a funnel flange which connects the filter compartment to the spout; a filtrate reservoir connected to the water reservoir, the funnel connected to the water reservoir such that the filter apparatus is generally intermediate the water reservoir and filtrate reservoir; a filtrate splash cover detachably connected to the filtrate reservoir for deflecting liquid into the filtrate reservoir; a pressure dissipator integrally molded within the filtrate reservoir for dissipating the pressure of the liquid passing from the filter apparatus into the filtrate reservoir; and means for relieving pressure within the device during heating in a microwave oven; whereby, upon heating with microwave energy, the liquid forms steam and the liquid and steam located in the water reservoir are pressurized and directed through the spout and the filter apparatus containing the particulate substance, and into the filtrate reservoir.

16. The espresso device of claim 15 wherein the filtrate reservoir and water reservoir cooperate to form a drinking cup for consuming individually-sized servings.

* * * * *